United States Patent
Yang et al.

(10) Patent No.: US 11,855,759 B2
(45) Date of Patent: Dec. 26, 2023

(54) DATA SYNCHRONIZATION METHOD, DEVICE, EQUIPMENT, SYSTEM AND STORAGE MEDIUM

(71) Applicant: Shenzhen Goodix Technology Co., Ltd., Shenzhen (CN)

(72) Inventors: Ke Yang, Shenzhen (CN); Chunlong Wang, Shenzhen (CN); Linyuan Xu, Shenzhen (CN)

(73) Assignee: Shenzhen Goodix Technology Co., Ltd., Shenzhen (CN)

( * ) Notice: Subject to any disclaimer, the term of this patent is extended or adjusted under 35 U.S.C. 154(b) by 506 days.

(21) Appl. No.: 17/137,820

(22) Filed: Dec. 30, 2020

(65) Prior Publication Data

US 2021/0119716 A1 Apr. 22, 2021

Related U.S. Application Data

(63) Continuation of application No. PCT/CN2019/104367, filed on Sep. 4, 2019.

(51) Int. Cl.
*H04J 3/06* (2006.01)
*H04W 4/80* (2018.01)
(Continued)

(52) U.S. Cl.
CPC ............ *H04J 3/0664* (2013.01); *H04J 3/065* (2013.01); *H04L 7/0012* (2013.01); *H04L 47/34* (2013.01); *H04W 4/80* (2018.02); *H04W 56/001* (2013.01)

(58) Field of Classification Search
CPC ........ H04J 3/065; H04J 3/0664; H04J 3/0697; H04L 7/0012; H04L 47/34; H04R 1/1016;
(Continued)

(56) References Cited

U.S. PATENT DOCUMENTS 7,120,149 B2 * 10/2006 Salamat .................. H04L 47/10
370/474
7,564,832 B2 * 7/2009 Van Parys ............. H04W 74/04
370/350
(Continued)

FOREIGN PATENT DOCUMENTS

CN 104012169 A 8/2014
CN 108108146 A 6/2018
(Continued)

OTHER PUBLICATIONS

First Office Action dated Oct. 28, 2022, in corresponding Chinese Application No. 201980002053.8, 10 pages.
(Continued)

*Primary Examiner* — Eric Nowlin
(74) *Attorney, Agent, or Firm* — Maier & Maier, PLLC (57) ABSTRACT

A data synchronization method, device, equipment, system and storage medium. Including: if a first data packet received by a slave device from a master device during a current Bluetooth low energy (BLE) connection interval is a new data packet, the slave device generates a hardware synchronization signal, which is a synchronization signal generated by a pure hardware circuit; if a data synchronization time of the slave device with the master device is a preset time in the current BLE connection interval, then the slave device performs data synchronization with the master device at the data synchronization time through triggering by the hardware synchronization signal.

15 Claims, 5 Drawing Sheets

(51) Int. Cl.
*H04L 7/00* (2006.01)
*H04L 47/34* (2022.01)
*H04W 56/00* (2009.01)

(58) Field of Classification Search
CPC .. H04R 2420/07; H04W 4/80; H04W 56/001; H04W 56/0015; H04W 56/005; Y02D 30/70

See application file for complete search history.

(56) References Cited

U.S. PATENT DOCUMENTS

| | | | | |
|---|---|---|---|---|
| 8,712,330 | B2* | 4/2014 | Desai | H04B 17/318 455/67.11 |
| 9,668,209 | B1* | 5/2017 | Knaappila | H04W 4/023 |
| 9,693,127 | B2* | 6/2017 | Kim | H04W 84/20 |
| 9,712,266 | B2* | 7/2017 | Linde | H04W 4/80 |
| 10,149,340 | B1* | 12/2018 | Rabii | H04W 76/25 |
| 10,368,169 | B1 | 7/2019 | Linsky et al. | |
| 10,405,369 | B2* | 9/2019 | Rabii | H04W 4/80 |
| 10,652,659 | B2* | 5/2020 | Bhalla | H04R 3/12 |
| 10,735,139 | B1* | 8/2020 | Goyal | H04L 1/1838 |
| 10,863,468 | B1* | 12/2020 | Kerai | H04J 3/0638 |
| 11,134,540 | B2* | 9/2021 | Eriksson | H04L 1/18 |
| 2002/0031125 | A1* | 3/2002 | Sato | H04L 47/10 370/474 |
| 2003/0012200 | A1* | 1/2003 | Salamat | H04L 47/34 370/400 |
| 2014/0348327 | A1 | 11/2014 | Linde et al. | |
| 2015/0334488 | A1* | 11/2015 | Kim | H04W 76/00 381/2 |
| 2017/0251469 | A1 | 8/2017 | Lee et al. | |
| 2019/0045304 | A1 | 2/2019 | Bhalla et al. | |
| 2019/0075611 | A1* | 3/2019 | Rabii | H04W 84/18 |
| 2019/0274556 | A1* | 9/2019 | Sun | A61B 5/6823 |
| 2020/0266927 | A1* | 8/2020 | Goyal | H04L 1/1838 |
| 2020/0275525 | A1* | 8/2020 | Eriksson | H04W 76/14 |
| 2020/0329052 | A1* | 10/2020 | Goyal | H04W 12/106 |
| 2021/0119716 | A1* | 4/2021 | Yang | H04W 56/005 |
| 2022/0360537 | A1* | 11/2022 | Varga | G06F 11/2097 |

FOREIGN PATENT DOCUMENTS

| | | | | |
|---|---|---|---|---|
| CN | 108337595 | A | | 7/2018 |
| CN | 108415685 | A | | 8/2018 |
| CN | 108616819 | A | | 10/2018 |
| CN | 109450490 | A | | 3/2019 |
| CN | 109565773 | A | | 4/2019 |
| CN | 112771941 | A * | 5/2021 | H04J 3/065 |
| CN | 114007209 | A * | 2/2022 | |
| CN | 112738782 | B * | 8/2022 | H04W 4/80 |
| CN | 112771941 | B * | 3/2023 | H04J 3/065 |
| DE | 102020114097 | A1 * | 12/2021 | H04L 69/28 |
| EP | 1168721 | A1 * | 1/2002 | H04L 29/06027 |
| EP | 3817466 | A1 * | 5/2021 | H04J 3/065 |
| JP | 2001189755 | A * | 7/2001 | H04L 29/06027 |
| WO | WO-0148980 | A1 * | 7/2001 | H04L 29/06027 |
| WO | 2018/053159 | A1 | 3/2018 | |
| WO | WO-2018076555 | A1 * | 5/2018 | A61B 5/0024 |
| WO | WO-2021042287 | A1 * | 3/2021 | H04J 3/065 |
| WO | WO-2021239274 | A1 * | 12/2021 | H04L 69/28 |

OTHER PUBLICATIONS

Huang et al., "Method of Hardware Clock Synchronization with High Precision for Wireless Sensor Network", Computer Engineering, China Academic Journal Electronic Publishing House, vol. 39, No. 12, Dec. 2013, pp. 97-101 (with partial English translation).

Extended European Search Report dated Jul. 6, 2021, including the Supplementary European Search Report and the European Search Opinion, in connection with corresponding EP Application 19933224.8 (7pp).

International Search Report and Written Opinion dated May 26, 2020 in corresponding International Application No. PCT/CN2019/104367; 11 pages.

* cited by examiner

A slave device obtains a proportional adjustment factor, an integral adjustment factor and a differential adjustment factor of a difference between an audio transmission time of a master device and an audio playback time of the slave device, and a difference $\Delta T(i)$ between the audio transmission time of the master device and the audio playback time of the slave device calculated for an i-th time from a data synchronization time, where $1 \leq i \leq k$, i is an integer, and k is a number of times the slave device calculates the difference between the audio transmission time of the master device and the audio playback time of the slave device from the data synchronization time to a current time  — S801

The slave device adjust the clock in the slave device according to the proportional adjustment factor, the integral adjustment factor, the differential adjustment factor, and the $\Delta T(i)$, so that the slave device performs audio synchronization with other slave device  — S802

DATA SYNCHRONIZATION METHOD, DEVICE, EQUIPMENT, SYSTEM AND STORAGE MEDIUM

CROSS-REFERENCE TO RELATED APPLICATIONS

This application is a continuation of International Application No. PCT/CN2019/104367, filed on Sep. 4, 2019, which is hereby incorporated by reference in its entirety.

TECHNICAL FIELD

This application relates to the field of communication technologies, and in particular, to a data synchronization method, device, equipment, system and storage medium.

BACKGROUND

At present, topological structures involved in wireless communication networks include: one-to-one topology, one-to-many topology, many-to-many topology, etc., where in the one-to-many topology, a master device can perform data transmission with multiple slave devices. For example: true wireless stereo (True Wireless Stereo, TWS) Bluetooth earphones and a mobile phone form a one-to-many topology, and for another example, bridge monitoring systems and precision machine tool control systems all involve the one-to-many topology.

Because Bluetooth low energy (Bluetooth Low Energy, BLE) technology has advantages of fast connection, wireless transmission, low power consumption and low cost, the BLE technology has been widely used in the one-to-many topology. In these communication systems, multiple slave devices need to perform data synchronization at appointed time. For example, in bridge monitoring systems and precision machine tool control systems, multiple slave devices need to collect sensor data at the appointed time simultaneously, or multiple slave devices need to control operation at the appointed time simultaneously. For another example, the TWS Bluetooth earphones on the left and right sides need to perform audio playback simultaneously, or multiple channels of a Bluetooth speaker need to perform audio playback simultaneously. Therefore, how to achieve data synchronization between slave devices has become an urgent technical problem to be solved in the present application.

SUMMARY

The present application provides a data synchronization method, device, equipment, system and storage medium, so as to achieve data synchronization between slave devices.

In a first aspect, the present application provides a data synchronization method, including: if a first data packet received by a slave device from a master device during a current Bluetooth low energy BLE connection interval is a new data packet, the slave device generates a hardware synchronization signal, where the hardware synchronization signal is a synchronization signal generated by a pure hardware circuit. If a data synchronization time of the slave device with the master device is a preset time in the current BLE connection interval, the slave device performs data synchronization with the master device at the data synchronization time through triggering by the hardware synchronization signal. That is, the slave device can perform data synchronization with other slave device through the hardware synchronization signal. Further, on the one hand, the hardware synchronization signal has higher generation efficiency than a software synchronization signal implemented by software program code, so that the efficiency of data synchronization between slave devices can be improved. On the other hand, a BLE protocol stack generally includes from bottom to top: physical layer, link layer, host controller interface, generic access profile, logical link control and adaptation protocol, security manager protocol and generic attribute profile. The master device sequentially constructs data packets from the top layer down and transmits them to the slave device through the physical layer. The slave device unpacks the data packets at each layer, and the above hardware synchronization signal can be generated at the physical layer or the link layer, but not at a higher protocol layer. In this way, the generation efficiency of the hardware synchronization signal can also be improved, and then the data synchronization efficiency can be improved.

Optionally, the data synchronization method further includes: the slave device starts a timer at a first BLE connection interval, and sets the data synchronization time to the timer, so that the timer generates an interrupt signal when the data synchronization time is reached, where the first BLE connection interval is any BLE connection interval before the current BLE connection interval. If the slave device does not generate a hardware synchronization signal during the current BLE connection interval, and the data synchronization time is the preset time in the current BLE connection interval, the slave device performs data synchronization with the master device at the data synchronization time through triggering by the interrupt signal. That is, if the slave device does not generate a hardware synchronization signal during the current BLE connection interval, and the data synchronization time is the preset time in the current BLE connection interval, at this time, the slave device can perform data synchronization with the master device at the data synchronization time through triggering by the interrupt signal generated by the timer. Therefore, it is ensured that respective slave devices can achieve data synchronization under any circumstances, and the reliability of data synchronization is improved.

Optionally, the data synchronization method further includes: if a first data packet received by the slave device from the master device in a second BLE connection interval is a new data packet, the slave device generates a hardware synchronization signal, where the second BLE connection interval is any BLE connection interval from the first BLE connection interval to a previous BLE connection interval of the current BLE connection interval. Every time the slave device generates a hardware synchronization signal, the slave device initializes the timer. The longer the timer is turned on, the lower the data synchronization accuracy is. Based on this, in this embodiment, if the slave device generates a hardware synchronization signal, it means that the hardware synchronization signal is valid and at this time, the slave device does not need to use the timer for data synchronization, so the slave device can initialize the timer, which can shorten the running time of the timer, thereby improving the accuracy of data synchronization.

Optionally, the first data packet includes: a next expected sequence number NESN and a sequence number SN of the first data packet. Correspondingly, the slave device judges whether the first data packet is a new data packet according to the NESN and the SN.

Optionally, each BLE connection interval has a corresponding serial number. If the slave device generates a hardware synchronization signal during a BLE connection interval, the slave device stores the corresponding serial number of the BLE connection interval. Correspondingly, before the slave device perform data synchronization with the master device at the data synchronization time through triggering by the hardware synchronization signal if the data synchronization time of the slave device with the master device is the preset time in the current BLE connection interval, the method further includes: the slave device determines the current BLE connection interval according to the corresponding serial number of each BLE connection interval.

Optionally, the slave device storing the corresponding serial number of the BLE connection interval, includes: the slave device stores the corresponding serial number of the BLE connection interval into a local register.

Optionally, performing data synchronization with other slave device at the data synchronization time includes: the slave device starts playing an audio code stream in synchronization with the master device at the data synchronization time. In this embodiment, the master device may be a terminal device or a chip in a terminal device, and the slave device may be an earphone or a chip in an earphone. In this embodiment, there may be one or more earphones.

Optionally, the data synchronization method further includes: the slave device obtains a proportional adjustment factor, an integral adjustment factor, and a differential adjustment factor of a difference between an audio transmission time of the master device and an audio playback time of the slave device, and a difference $\Delta T(i)$ between the audio transmission time of the master device and the audio playback time of the slave device calculated for an i-th time from the data synchronization time, where $1 \leq i \leq k$, i is an integer, k is a number of times that the slave device calculates the difference between the audio transmission time of the master device and the audio playback time of the slave device from the data synchronization time to a current time; the slave device adjusts a clock in the slave device according to the proportional adjustment factor, the integral adjustment factor, the differential adjustment factor, and $\Delta T(i)$, so that the slave device performs data synchronization with the master device.

Optionally, the slave device obtaining the difference $\Delta T(i)$ between the audio transmission time of the master device and the audio playback time of the slave device calculated for the i-th time from the data synchronization time, includes: from the data synchronization time, the slave device counts a number N1 of frames of audio played by the slave device, a number N2 of hardware synchronization signals generated by the slave device, a time T3 from a generation time of a latest hardware synchronization signal to a first preset time t (i), until the first preset time t(i); the slave device obtains a time length T2 of a BLE connection interval, a time length T1 of each frame of audio played by the slave device; the slave device determines the difference $\Delta T(i)$ between the audio transmission time of the master device and the audio playback time of the slave device until the first preset time t(i) according to N1, N2, T3, T2, and T1.

In this embodiment, a TWS Bluetooth earphone can use the hardware synchronization signal to determine a difference between an audio transmission time of the terminal device and an audio playback time of the TWS Bluetooth earphone, and adjust a clock in the TWS Bluetooth earphone according to the difference to enable audio synchronization between the TWS Bluetooth earphone and the terminal device. On the one hand, the hardware synchronization signal has higher generation efficiency than a software synchronization signal implemented by software program code, so that the efficiency of data synchronization between slave devices can be improved. On the other hand, a BLE protocol stack generally includes from bottom to top: physical layer, link layer, host controller interface, generic access profile, logical link control and adaptation protocol, security manager protocol, and general attribute profile. The master device sequentially constructs data packets from the top layer down, and transmits them to the slave device through the physical layer. The slave device unpacks the data packets at each layer, and the above hardware synchronization signal can be generated at the physical layer or the link layer, but not at a higher protocol layer. In this way, the generation efficiency of the hardware synchronization signal can also be improved, and then the data synchronization efficiency can be improved.

Optionally, the slave device determines $\Delta T$ (i) according to a following formula, including:

$$\Delta T(i)=(N2*T2+T3)-N1*T1$$

Optionally, a difference between the first preset time t(i) and the data synchronization time is a common multiple of T1 and T2.

Optionally, the data synchronization method further includes: the slave device adjusts $\Delta T(i)$ to be within a clock range of the slave device. Correspondingly, the slave device adjusting the clock in the slave device according to the proportional adjustment factor, the integral adjustment factor, the differential adjustment factor, and $\Delta T(i)$, includes: the slave device adjusts the clock in the slave device according to the proportional adjustment factor, the integral adjustment factor, the differential adjustment factor, and the adjusted $\Delta T(i)$.

Optionally, the preset time in the current BLE connection interval is any one of the following: a start time of the current BLE connection interval, a generation time of the hardware synchronization signal, and a second preset time after the generation time of the hardware synchronization signal.

Optionally, before the slave device performs data synchronization with the master device at the data synchronization time through triggering by the hardware synchronization signal if the data synchronization time of the slave device with the master device is the preset time in the current BLE connection interval, the method further includes: determining the data synchronization time.

The following will provide a slave device, a data synchronization system, a computer storage medium, and a computer program product. For the contents and effects thereof, please refer to the contents and effects corresponding to the first aspect or optional manners of the first aspect.

In a second aspect, the present application provides a slave device, including: a baseband and a processor. The baseband is configured to generate a hardware synchronization signal if a first data packet received by the baseband from a master device during a current Bluetooth low energy BLE connection interval is a new data packet, where the hardware synchronization signal is a synchronization signal generated by a pure hardware circuit; and the processor is configured to, if a data synchronization time of the slave device with the master device is a preset time in the current BLE connection interval, perform data synchronization with the master device at the data synchronization time through triggering by the hardware synchronization signal.

In a third aspect, the present application provides a data synchronization system, including a master device and a slave device, and the slave device is configured to execute the data synchronization method described in the first aspect or optional manners of the first aspect.

In a fourth aspect, the present application provides a chip configured to execute the data synchronization method described in the first aspect or optional manners of the first aspect.

In a fifth aspect, the present application provides a computer storage medium, including: computer-executable instructions, and the computer-executable instructions are configured to implement the data synchronization method as described in the first aspect or optional manners of the first aspect.

The present application provides a data synchronization method, device, equipment, system and storage medium. Data synchronization can be achieved between the slave device and the master device through the hardware synchronization signal. On the one hand, the hardware synchronization signal has higher than a software synchronization signal implemented by software program code, so that the efficiency of data synchronization between slave devices can be improved. On the other hand, the BLE protocol stack generally includes from bottom to top: physical layer, link layer, host controller interface, generic access profile, logical link control and adaptation protocol, security manager protocol, and generic attribute profile. The master device sequentially constructs data packets from the top layer down, and transmits them to the slave device through the physical layer. The slave device unpacks the data packets at each layer, and the above hardware synchronization signal can be generated at the physical layer or the link layer, but not at a higher protocol layer. In this way, the generation efficiency of the hardware synchronization signal can also be improved, and then the data synchronization efficiency can be improved. In addition, if the slave device does not generate a hardware synchronization signal during the current BLE connection interval, and the data synchronization time is not the preset time in the current BLE connection interval, the slave device can perform data synchronization with other slave device at the data synchronization time through triggering by the interrupt signal generated by the timer. Therefore, data synchronization is ensured between the slave device and the master device, and then it is ensured that respective slave devices can achieve data synchronization in any circumstances, thereby improving the reliability of data synchronization.

BRIEF DESCRIPTION OF DRAWINGS

In order to explain the technical solutions in the embodiments of the present application or the prior art more clearly, the following will briefly introduce the drawings that are required in describing the embodiments or the prior art. Obviously, the drawings in the following description are some embodiments of the present application. For those of ordinary skill in the art, other drawings can be obtained from these drawings without paying any creative efforts.

DESCRIPTION OF EMBODIMENTS

In order to make the purpose, technical solutions and advantages of the embodiments of the present application clearer, the technical solutions in the embodiments of the present application will be described clearly and completely in conjunction with the drawings in the embodiments of this application. Obviously, the described embodiments are part of the embodiments of the present application, rather than all of the embodiments. Based on the embodiments in the present application, all other embodiments obtained by those of ordinary skill in the art without creative efforts shall fall within the protection scope of this application.

The terms "first", "second", etc. (if any) in the description and claims of the present application and the above-mentioned drawings are used to distinguish similar objects, but are not necessarily used to describe a specific order or sequence. It should be understood that the data used in this way can be interchanged under appropriate circumstances, so that the embodiments of the present application described herein, for example, can be implemented in a sequence other than those illustrated or described herein. In addition, the terms "including" and "having" and any variations of them are intended to cover non-exclusive inclusions. For example, a process, method, system, product, or device that includes a series of steps or units is not necessarily limited to those clearly listed steps or units, but may include other steps or units that are not clearly listed or are inherent to the process, method, product, or equipment.

As mentioned above, how to achieve data synchronization between slave devices has become a technical problem to be solved urgently in the present application. To solve this technical problem, the present application provides a data synchronization method, device, equipment, system, and storage medium.

Figure 1:
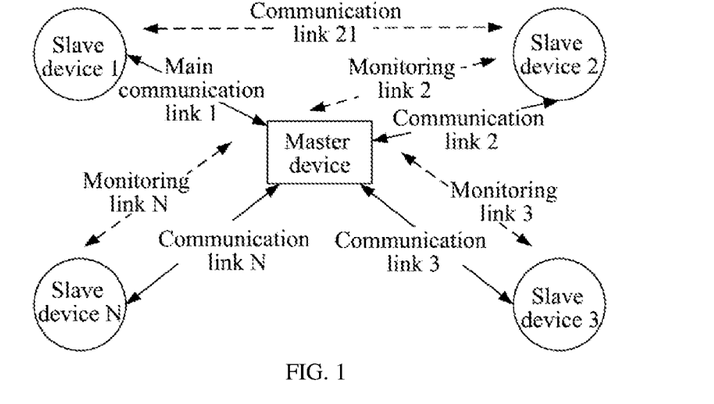
FIG. 1 is a schematic diagram of a one-to-many topology based on a BLE connection provided by an embodiment of the present application.

Illustratively, FIG. 1 is a schematic diagram of a one-to-many topology based on BLE connection provided by an embodiment of the present application. Here, the master device may be a mobile phone, a computer, or other types of electronic devices, and the master device may also be any chip in these electronic devices. The slave device may be TWS Bluetooth earphones on the left and right sides, a smart speaker or other types of electronic devices, and the slave device may also be any chip in these electronic devices. Compared with the slave device, the master device has more complex functions and more hardware resources. The master device generally uses a wireless local area network (Wireless Local Area Network, WLAN), an Ethernet, a $3^{rd}$ generation (3 Generation, 3G) mobile communication system, and a $4^{th}$ generation (4 Generation, 4G) mobile communication system or other interfaces for external communications, and it has a complex and accurate clock system and maintains a relatively accurate local clock. As mentioned above, the slave device 1 and the slave device 2 can be TWS Bluetooth headset earphones on the left and right sides. The slave device usually has simpler functions and fewer hardware resources, and most of them are battery-powered, and need to take into account the requirements of low power consumption and performance As shown in FIG. 1, a main communication link 1 is a communication link between the master device and the slave device 1. This link is a primary communication link, and it is also a primary communication link between the master device and other slave device. Each slave device may obtain clock synchronization information from the master device based on the main communication link 1.

A monitoring link 2, a monitoring link 3, and a monitoring link N respectively correspond to monitoring links of the slave device 2, the slave device 3, and the slave device N. These monitoring links are all monitoring the main communication link 1, but are different from the main communication link 1. In the main communication link 1, when the slave device 1 receives a data packet, it will transmit an acknowledgement (Acknowledge, ACK) to the master device. While in the monitoring link, after a slave device corresponding to a monitoring link parses out a data packet, it does not transmit an ACK to the master device, but passively monitors.

A communication link 2, a communication link 3, and a communication link N respectively correspond to communication links of the slave device 2, the slave device 3 and the slave device N with the master device. These links may be used as communication links between slave devices other than the slave device 1 and the master device. In an actual solution, these communication links may not be needed, because the monitoring links do not have an ACK response. Only by means of the communication links can ACK handshake communication between each slave device and the master device be realized.

Communication links may also be established between slave devices. For example, a communication link 21 is a communication link between the slave device 2 and the slave device 1. This link is only needed when the monitoring link 2 is established. First, the slave device 2 obtains all communication parameters of the main communication link 1 from the slave device 1 through the communication link 21, and then establishes the monitoring link 2 according to these parameters. After the monitoring link 2 is established, the slave device 2 and the slave device 1 may disconnect the communication link 21.

Figure 2:
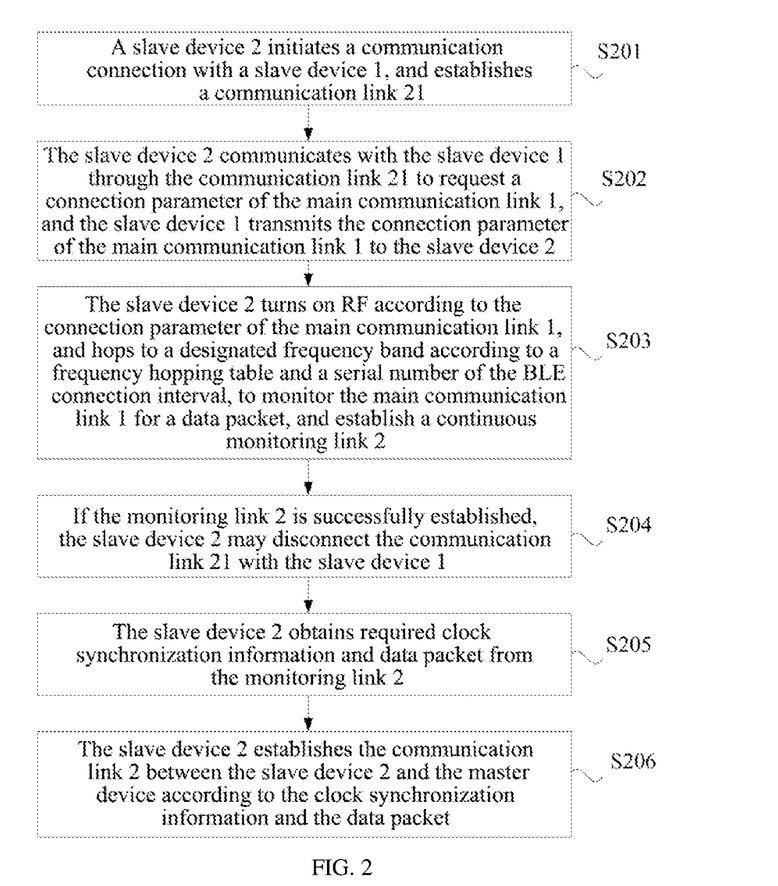
FIG. 2 is a method flowchart of a method for joining a topology by a slave device 2 according to an embodiment of the present application.

It is assumed that the main communication link 1 has been established between the slave device 1 and the master device, the slave device 1 has particularity among all slave devices, and the main communication link 1 is a link referred to by all other slave device. The slave device 2 is taken as an example to illustrate the process of joining a topology by slave device 2 (where, the process for joining a topology by the slave device 3, . . . , the slave device N and other slave devices is the same as that of joining a topology by the slave device 2). FIG. 2 is a flowchart of a method for joining a topology by the slave device 2 according to an embodiment of the present application. As shown in FIG. 2, the process of joining a topology by the slave device 2 includes:

Step S201: the slave device 2 initiates a communication connection with the slave device 1, and establishes a communication link 21.

Step S202: the slave device 2 communicates with the slave device 1 through the communication link 21 to request a connection parameter of the main communication link 1, and the slave device 1 transmits the connection parameter of the main communication link 1 to the slave device 2.

Here, the connection parameter of the main communication link 1 includes at least one of the following: an access address of the slave device 1, a frequency hopping table of the slave device 1, and a serial number of a BLE connection interval to which a time to join belongs, where the time to join is a time for the slave device 2 to join the topology.

Step S203: the slave device 2 turns on a radio frequency (Radio Frequency, RF) according to the connection parameter of the main communication link 1, and hops to a designated frequency band according to a frequency hopping table and a serial number of the BLE connection interval to monitor the main communication link for a data packet, and establish a continuous monitoring link 2.

Step S204: if the monitoring link 2 is successfully established, the slave device 2 may disconnect the communication link 21 with the slave device 1.

(Optionally) Step S205: the slave device 2 obtains the required clock synchronization information and data packet from the monitoring link 2.

(Optionally) Step S206: the slave device 2 establishes the communication link 2 between the slave device 2 and the master device according to the clock synchronization information and the data packet.

The communication link 2 is configured for the master device to transmit specific data to the slave device 2, and the communication link 2 may be established according to actual application scenarios.

The technical solutions of the present application will be described in the following in combination with above application scenarios.

Figure 3:
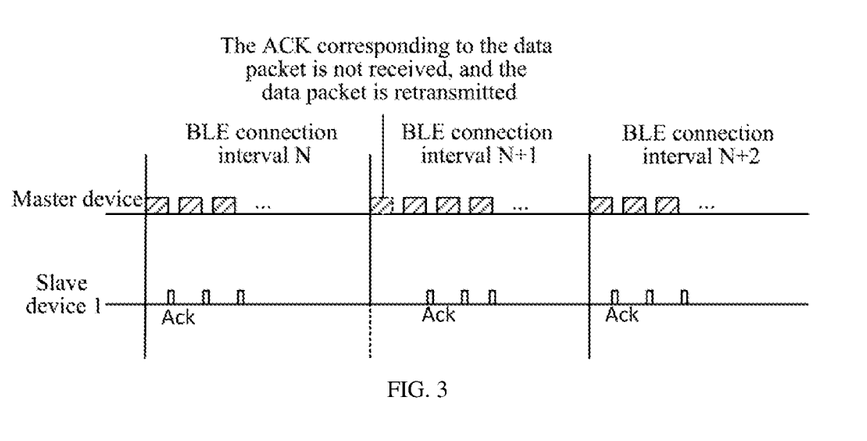
FIG. 3 is a schematic diagram of a generation mechanism for a hardware synchronization signal provided by an embodiment of the present application.

In the present application, when a first data packet received by a slave device in a certain BLE connection interval is a new data packet, a hardware synchronization signal is then generated, where the hardware synchronization signal may be generated at a start time of the BLE connection interval. The hardware synchronization signal is a synchronization signal generated by a pure hardware circuit. Since the BLE connection interval is controlled by a clock of the master device, the hardware synchronization signal generated by the slave device may be used as a reference clock of the terminal device. Specifically, FIG. 3 is a schematic diagram of a generation mechanism of a hardware synchronization signal provided by an embodiment of the present application. As shown in FIG. 3, the master device may transmit one or more data packets to the slave device 1 in each BLE connection interval (Connection interval, CI) according to a size of a data payload to be transmitted. Optionally, in order to improve anti-interference performance and safety, the master device may perform frequency hopping at the BLE connection interval, where a sequence for the frequency hopping is according to an agreed frequency hopping algorithm and frequency hopping table. For example, as shown in FIG. 3, at the start time of a BLE connection interval N, the master device starts to transmit a BLE data packet. If the slave device 1 receives the data packet, it will transmit an ACK to the master device. But if the slave device 1 does not receive the data packet, or even if it receives the data packet, but verification of the data packet through a cyclic redundancy check (Cyclic Redundancy Check, CRC) of the data packet fails, the slave device 1 does not transmit an ACK to the master device. As shown in FIG. 3, the slave device 1 does not receive the first data packet of the master device in the BLE connection interval N+1, and then the slave device 1 does not transmit an ACK to the master device. Based on this, the master device will retransmit the data packet until the master receives the ACK transmitted by the slave device 1, and then continues to transmit a next data packet. For the slave device i (2≤i≤N) that monitors the main communication link 1 on a corresponding monitoring link, when packet loss occurs, for example: in the BLE connection interval N+1, the slave device 2 may receive four data packets, one of which is a retransmitted data packet, based on this, the slave device 2 needs to discard the retransmitted data packet.

Figure 4:
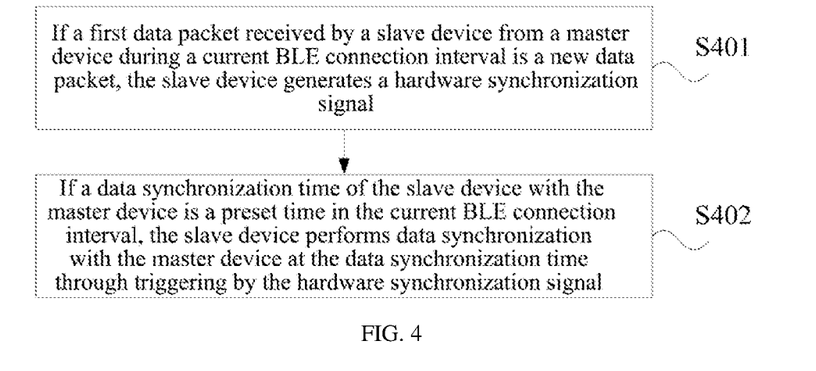
FIG. 4 is a flowchart of a data synchronization method provided by an embodiment of the present application.

FIG. 4 is a flowchart of a data synchronization method provided by an embodiment of the present application. The method is applied to any of the foregoing slave devices. As shown in FIG. 4, the data synchronization method includes the following steps:

Step S401: if a first data packet received by a slave device from a master device in a current BLE connection interval is a new data packet, the slave device generates a hardware synchronization signal.

Step S402: if a data synchronization time of the slave device with the master device is a preset time in the current BLE connection interval, the slave device performs data synchronization with the master device at the data synchronization time through triggering by the hardware synchronization signal.

Illustratively, assuming that the master device is a terminal device and the slave device is a left or right TWS Bluetooth earphone, the data synchronization time may be the time when the slave device starts to play audio. A user may set the data synchronization time on the terminal device. The data synchronization time may be set as a start time of a certain BLE connection interval.

Optionally, the preset time in the current BLE connection interval is any one of the following: a start time of the current BLE connection interval, a generation time of the hardware synchronization signal, or a second preset time after the generation time of the hardware synchronization signal.

Assuming that transmission duration of the new data packet is ignored, the data synchronization time may then be the start time of the current BLE connection interval. The foregoing preset time may be a time when a slave device finishes receiving the new data packet.

As mentioned above, for any slave device, there may be a situation where a data packet cannot be received. In this case, the master device will retransmit the data packet, which can be called a retransmitted data packet. Therefore, the first data packet received by the slave device during the current BLE connection interval may be a new data packet. For example, as shown in FIG. 3, in the BLE connection interval N, the first data packet received by the slave device 1 is a new data packet. Or, the first data packet received by the slave device in the current BLE connection interval may be a retransmitted data packet.

Figure 5:
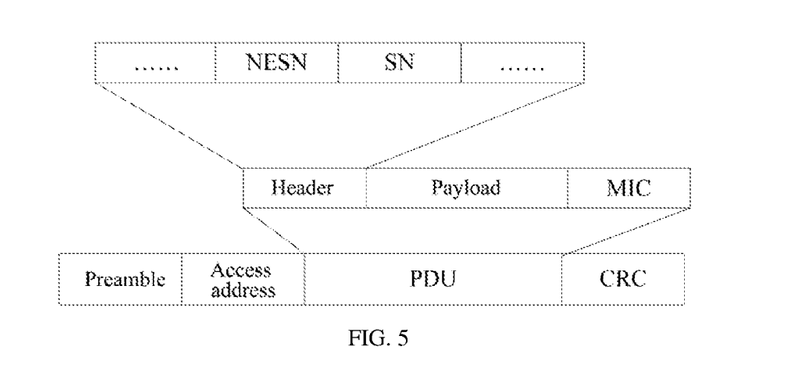
FIG. 5 is a schematic diagram of a data packet format provided by an embodiment of the present application.

FIG. 5 is a schematic diagram of a data packet format provided by an embodiment of the present application. As shown in FIG. 5, each data packet includes: fixed preamble (Preamble), access address (Access Address), protocol data unit PDU (Protocol Data Unit) and CRC fields. Among them, PDU includes: header (Header), payload (payload) and message integrity check (Messages Integrity Check, MIC) fields. The header part respectively includes a next expected sequence number (Next Expected Sequence Number, NESN) and a sequence number (Sequence Number, SN) of the data packet. When the NESN of the data packet is the same as the SN, it means that the data packet is a retransmitted data packet. Otherwise, when the NESN of the data packet is different from the SN, it means that the data packet is a new data packet.

In the present application, in order to realize data synchronization between slave devices, if the first data packet received by the slave device from the master device during the current BLE connection interval is a new data packet, the slave device generates a hardware synchronization signal. The so-called hardware synchronization signal refers to a synchronization signal generated by a pure hardware circuit, rather than a synchronization signal generated by software program code, where the pure hardware circuit may not be loaded with any software program code.

If the data synchronization time of the slave device with the master device is the preset time in the current BLE connection interval, the slave device performs data synchronization with the master device at the data synchronization time through triggering by the hardware synchronization signal. In addition, if there are multiple slave devices, data synchronization between the slave devices can be achieved through the multiple slave devices performing data synchronization with the master device at the data synchronization time. If the data synchronization time is not the preset time in the current BLE connection interval, the slave device does not perform data synchronization with the master device. Assuming that the data synchronization time is the start time of a $20^{th}$ BLE connection interval, when the first data packet received by the slave device is a new data packet in any BLE connection interval of the $1^{st}$-$19^{th}$ BLE connection intervals, the slave device generates a hardware synchronization signal, but the slave device does not perform data synchronization with the master device since the data synchronization time is not the start time of any BLE connection interval of the $1^{st}$-$19^{th}$ BLE connection intervals. Until the $20^{th}$ BLE connection interval, if the slave device generates a hardware synchronization signal, and the data synchronization time is the start time of the BLE connection interval, and at this time, the slave device performs data synchronization with the master device at the start time of the $20^{th}$ BLE connection interval through triggering by the hardware synchronization signal.

Optionally, each BLE connection interval has a corresponding serial number. If the slave device generates a hardware synchronization signal during a BLE connection interval, the corresponding serial number of the BLE connection interval may be stored in a local register, a memory or a cloud server. Based on this, the slave device first determines the current BLE connection interval according to the corresponding serial number of the current BLE connection interval, and then determines whether the data synchronization time is the preset time in the current BLE connection interval.

In this embodiment, the slave device can realize data synchronization with the master device through a hardware synchronization signal, and thus data synchronization can be realized between respective slave devices. Further, on the one hand, the hardware synchronization signal has higher generation efficiency than a software synchronization signal implemented by software program code, so that the efficiency of data synchronization between slave devices can be improved. On the other hand, a BLE protocol stack generally includes from bottom to top: physical layer (Physical Layer, PH), link layer (Link Layer, LL), host controller interface (Host Controller Interface, HCI), generic access profile (Generic Access Profile, GAP), logic link control and adaptation protocol (Logic Link Control and Adaptation Protocol, L2CAP), secure manager protocol (Secure Manager Protocol, SMP), and generic attribute profile (Generic Attribute Profile, GATT). The master device sequentially constructs data packets from the top layer down, and transmits to the slave device through the physical layer. The slave device unpacks the data packet at each layer, and the above-mentioned hardware synchronization signal can be generated at the physical layer or the link layer, but not at a higher protocol layer. In this way, the generation efficiency of the hardware synchronization signal can also be improved, and then the data synchronization efficiency can be improved.

As mentioned above, when the first data packet received by the slave device in any BLE connection interval is a retransmitted data packet, the transmission time of the retransmitted data packet may not be aligned with the start time of the BLE connection interval. In this case, the slave device does not generate a hardware synchronization signal. In order to achieve data synchronization between slave devices in the case of no hardware synchronization signal generated, the present application provides the following technical solutions.

Figure 6:
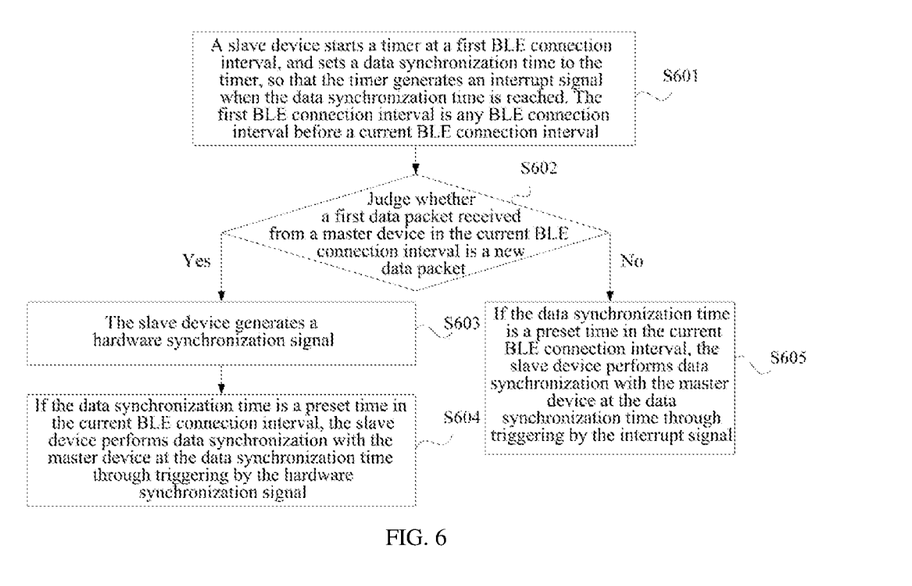
FIG. 6 is a flowchart of a data synchronization method provided by another embodiment of this application.

FIG. 6 is a flowchart of a data synchronization method provided by another embodiment of the present application. The method is applied to any of the foregoing slave devices. As shown in FIG. 6, the data synchronization method includes the following steps.

Step S601: a slave device starts a timer at a first BLE connection interval, and sets a data synchronization time to the timer, so that the timer generates an interrupt signal when the data synchronization time is reached. The first BLE connection interval is any BLE connection interval before a current BLE connection interval.

Step S602: the slave device judges whether a first data packet received from a master device in the current BLE connection interval is a new data packet, and if the first data packet is a new data packet, step S603 and step S604 are executed. If the first data packet is a retransmitted data packet, step S605 is executed.

Step S603: the slave device generates a hardware synchronization signal.

Step S604: if the data synchronization time is a preset time in the current BLE connection interval, the slave device performs data synchronization with the master device at the data synchronization time through triggering by the hardware synchronization signal.

Step S605: if the data synchronization time is the preset time in the current BLE connection interval, the slave device performs data synchronization with the master device at the data synchronization time through triggering by the interrupt signal.

For step S602, step S603, and step S604, reference can be made to the previous embodiment. Explanation is made in the following mainly for the case that the slave device does not generate the hardware synchronization signal in the current BLE connection interval, and the data synchronization time is not the preset time in the current BLE connection interval.

The above-mentioned interrupt signal is configured to trigger the slave device to perform data synchronization with the master device.

Optionally, if the first data packet received by the slave device from the master device in a second BLE connection interval is a new data packet, the slave device generates a hardware synchronization signal, where the second BLE connection interval is any BLE connection interval from the first BLE connection interval to a previous BLE connection interval of the current BLE connection interval. Every time the slave device generates a hardware synchronization signal, the slave device initializes a timer. Specifically, the method of implementing data synchronization between slave devices by starting a timer is generally less efficient than the method of implementing data synchronization between the slave devices through the hardware synchronization signal. Moreover, the longer the timer is on, the lower the data synchronization accuracy will be. Based on this, in this embodiment, every time the slave device generates a hardware synchronization signal, which means that the hardware synchronization signal is valid, and at this time, the slave device does not need to use the timer for data synchronization, so the slave device may initialize the timer, which can shorten the running time of the timer. If in the current BLE connection interval, the slave device does not generate a hardware synchronization signal, it indicates that the slave device cannot perform data synchronization through the hardware synchronization signal. At this time, if the data synchronization time is the preset time in the current BLE connection interval, the slave device performs data synchronization with the master device at the data synchronization time through triggering by the interrupt signal.

Assuming that the data synchronization time is the start time of the $20^{th}$ BLE connection interval, the slave device starts the timer in the first BLE connection interval. If in the $1^{st}$ BLE connection interval, the first data packet received by the slave device is a new data packet, the slave device generates a hardware synchronization signal and initializes the timer. If in the $2^{nd}$ BLE connection interval, the first data packet received by the slave device is a retransmitted data packet, the slave device does not generate a hardware synchronization signal . . . . If in the $19^{th}$ BLE connection interval, the first data packet received by the slave device is a new data packet, the slave device generates a hardware synchronization signal and initializes the timer. If in the $20^{th}$ BLE connection interval, the first data packet received by the slave device is a retransmitted data packet, the slave device does not generate a hardware synchronization signal, and at this time, the data synchronization time is the start time of the $20^{th}$ BLE connection interval, and the timer reaches the data synchronization time and generates an interrupt signal, and the slave device performs data synchronization with the master device at the data synchronization time under the triggering of the interrupt signal. If in the $20^{th}$ BLE connection interval, the first data packet received by the slave device is a new data packet, the slave device generates a hardware synchronization signal, and at this time, the data synchronization time is the start time of the $20^{th}$ BLE connection interval, and then the slave device performs data synchronization with the master device at the data synchronization time under the triggering of the hardware synchronization signal.

In this embodiment, if the slave device does not generate the hardware synchronization signal during the current BLE connection interval, and the data synchronization time is the preset time in the current BLE connection interval, at this time, the slave device can perform data synchronization with the master device at the data synchronization time through triggering by the interrupt signal generated by the timer. Therefore, it is ensured that respective slave devices can achieve data synchronization under any circumstances, thereby improving the reliability of data synchronization. Further, the longer the timer is on, the lower the data synchronization accuracy will be. Based on this, in this embodiment, every time the slave device generates a hardware synchronization signal, which means that the hardware synchronization signal is valid, and the slave device does not need to use the timer for data synchronization at this time, so the slave device can initialize the timer, which can shorten the running time of the timer, thereby improving the accuracy of data synchronization.

As mentioned above, explanation is provided by taking the master device being a terminal device, such as a mobile phone, and the slave device being a left or right TWS Bluetooth earphone as an example. Among them, the terminal device may transmit an audio code stream to the slave device through a Bluetooth interface, and after receiving the audio code stream, the left and right TWS Bluetooth earphones perform left and right channel audio decoding and playing respectively. Generally, the master device has more complex functions and more hardware resources. The master device generally performs external communications through WLAN, Ethernet, 3G mobile communication system, 4G and other interfaces, and has a complex and accurate clock system and maintains a relatively accurate local clock. The TWS Bluetooth earphones on the left and right sides, as slave devices, have simpler functions and less hardware resources, so they cannot be designed with a complex clock system. Therefore, there is inevitably a mismatch between the speed at which the terminal device transmits the audio code stream and the speed at which the TWS Bluetooth earphones on the left and right sides play the audio code stream. When the audio code stream is played for a long time, the difference between the number of frames of audio transmitted by the terminal device and the number of frames of audio played by the TWS Bluetooth earphones on the left and right sides will become larger and larger. Because a buffer size of the TWS Bluetooth earphones on the left and right sides is limited, the buffer will overflow or become empty, which will cause abnormal audio playback. On the other hand, there will be a difference in the playback speed between the TWS Bluetooth earphones on the left and right sides, that is, the TWS Bluetooth earphones on the left and right sides cannot play audio synchronously, resulting in a poor user experience. In order to solve this technical problem, this embodiment will achieve audio synchronization between the TWS Bluetooth earphones on the left and right sides with the aforementioned hardware synchronization signal. It should be noted that the following embodiment is not only applicable to the case where the master device is a terminal device and the slave device is a TWS Bluetooth earphone on the left or right.

Figure 7:
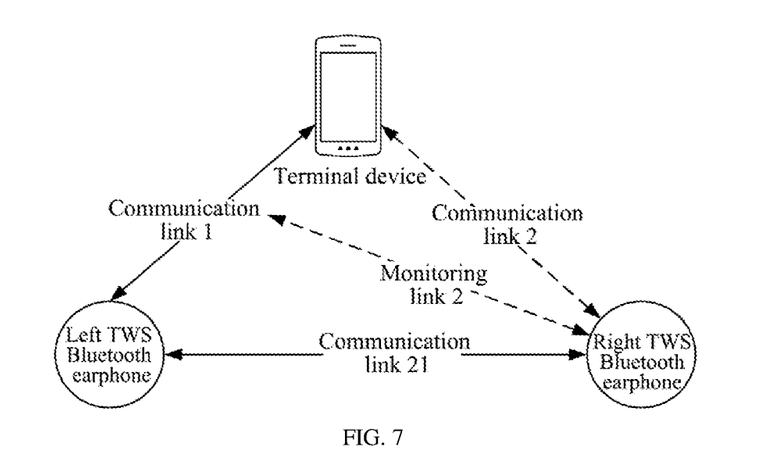
FIG. 7 is a schematic diagram of a one-to-many topology based on a BLE connection provided by an embodiment of the present application.

Illustratively, FIG. 7 is a schematic diagram of a one-to-many topology based on a BLE connection provided by an embodiment of the present application. FIG. 7 is similar to FIG. 1, where a master device is a terminal device, two slave devices are a left TWS Bluetooth earphone and a right TWS Bluetooth earphone. A communication link 1 is configured for data communication between the terminal device and a primary TWS Bluetooth earphone (taking the left TWS Bluetooth earphone as an example). This link is mainly configured to transmit audio code streams. At the same time, the left TWS Bluetooth earphone can generate a hardware synchronization signal according to the communication link 1. The hardware synchronization signal can realize audio code stream speed synchronization between the left TWS Bluetooth earphone and the terminal device. The communication link 21 is configured for data interaction between the right TWS Bluetooth earphone and the left TWS Bluetooth earphone, including connection information, or forwarding audio code stream data, etc. This link is also a prerequisite for establishing a monitoring link 2. The monitoring link 2 is a link for the TWS Bluetooth earphone (taking the right TWS Bluetooth earphone as an example) to monitor the communication link 1. Through the monitoring link 2, the right TWS Bluetooth earphone can obtain an audio code stream transmitted by the terminal device from the communication link 1, and also obtain a hardware synchronization signal from the communication link 1 through the monitoring link 2. This monitoring link is different from a normal communication link in that, the normal communication link has an ACK reply mechanism for the terminal device, and will ensure correct receipt of data, but the monitoring link 2 does not have an ACK reply mechanism, so packet loss will occur sometime.

The main idea of this embodiment is that the TWS Bluetooth earphone can generate a hardware synchronization signal at a preset time in the BLE connection interval, and the TWS Bluetooth earphone can use the hardware synchronization signal as a reference clock of the terminal device side. The TWS Bluetooth earphone can count the audio transmission time of the terminal device with the help of the number of hardware synchronization signals. The TWS Bluetooth earphone can also record the audio playback time of the TWS Bluetooth earphone with a local clock, and calculate the difference between the audio transmission time of the terminal device and the audio playback time of the TWS Bluetooth earphone. The TWS Bluetooth earphone can adjust the clock in the TWS Bluetooth earphone according to a proportional factor, an integral adjustment factor, a differential adjustment factor of the difference between the audio transmission time of the master device and the audio playback time of the slave device, and the difference between the audio transmission time of the terminal device and the audio playback time of the TWS Bluetooth earphone, so as to perform data synchronization between the left and right TWS Bluetooth earphones.

Figure 8:
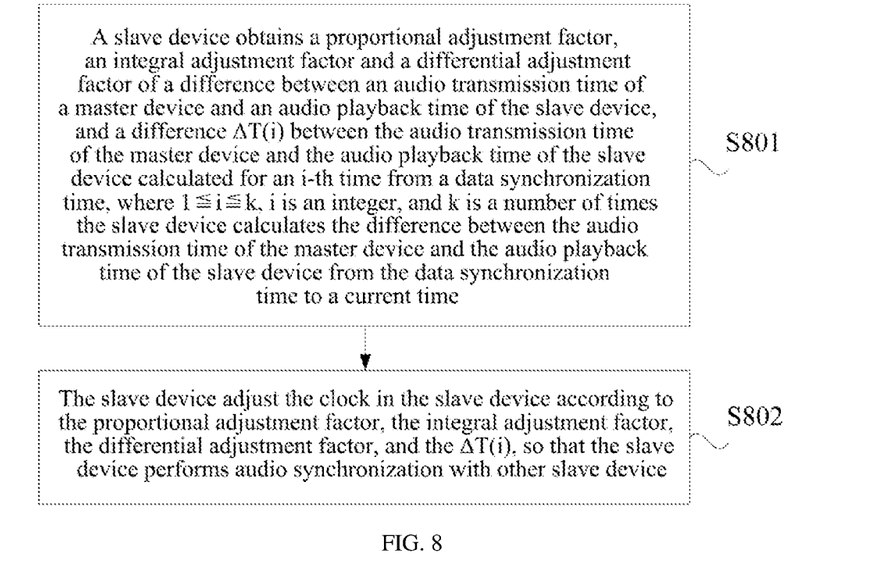
FIG. 8 is a flowchart of a data synchronization method provided by still another embodiment of the present application.

FIG. 8 is a flowchart of a data synchronization method provided by another embodiment of the present application. The method is applied to a TWS Bluetooth earphone. As shown in FIG. 8, the data synchronization method includes the following steps:

Step S801: a slave device obtains a proportional adjustment factor, an integral adjustment factor and a differential adjustment factor of a difference between an audio transmission time of a master device and an audio playback time of the slave device, and a difference $\Delta T(i)$ between the audio transmission time of the master device and the audio playback time of the slave device calculated for an i-th time from a data synchronization time, where $1 \leq i \leq k$, i is an integer, and k is a number of times the slave device calculates the difference between the audio transmission time of the master device and the audio playback time of the slave device from the data synchronization time to a current time.

Step S802: the slave device adjusts the clock in the slave device according to the proportional adjustment factor, the integral adjustment factor, the differential adjustment factor, and $\Delta T(i)$, so that the slave device performs audio synchronization with other slave device.

Optionally, from the data synchronization time, the slave device counts a number N1 of frames of audio played by the slave device, a number N2 of hardware synchronization signals generated by the slave device, a time T3 from a generation time of a latest hardware synchronization signal to a first preset time t(i), until the first preset time t(i); the slave device obtains a time length T2 of a BLE connection interval, and a time length T1 of each frame of audio played by the slave device; the slave device determines the difference $\Delta T(i)$ between the audio transmission time of the master device and the audio playback time of the slave device until the first preset time t(i) according to N1, N2, T3, T2, and T1. For example: from the data synchronization time of the device, the slave device counts the number N1 of frames of audio played by the slave device, the number N2 of hardware synchronization signals generated by the slave device, the time T3 from the generation time of the latest hardware synchronization signal to the current time, until the current moment; the slave device obtains the time length T2 of the BLE connection interval and the time length T1 of each frame of audio played by the slave device; and the slave device determines the difference ΔT(k) between the audio transmission time of the master device and the audio playback time of the slave device until the current time according to N1, N2, T3, T2, and T1.

Figure 9:
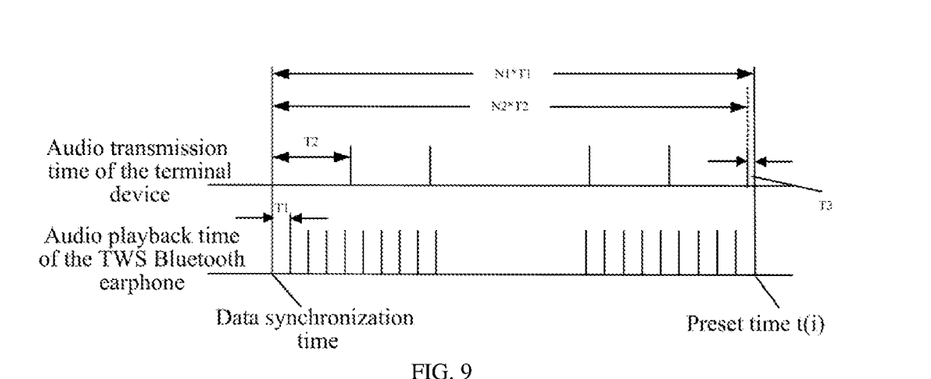
FIG. 9 is a schematic diagram of a difference between an audio transmission time of a terminal device and an audio playback time of a TWS Bluetooth earphone according to an embodiment of the present application.

FIG. 9 is a schematic diagram of a difference between an audio transmission time of a terminal device and an audio playback time of a TWS Bluetooth earphone according to an embodiment of the present application. As shown in FIG. 9, local audio played by the TWS Bluetooth earphone is counted in frames. After each frame of audio is played, an interrupt will be generated. Assuming that a time interval of playing each frame of audio is T1 (that is, a time length of each frame of played audio is T1), a time length of a BLE connection interval is T2, and T1 and T2 may be in milliseconds. The TWS Bluetooth earphone can set the difference between the first preset time t(i) and the data synchronization time to be a common multiple of T1 and T2. For example, M*[T1, T2] is the first preset time t(i), the first preset time t(i) is also called a time point for dynamic synchronization adjustment, where the TWS Bluetooth earphone can choose different options at different stages. For example, in an early stage of audio playback, due to a large difference between clocks of the TWS Bluetooth earphone and the terminal device, it is necessary to match the audio code stream transmission speed on the terminal device side with the code stream playback speed on the earphone side as soon as possible. Therefore, a small value of M may be chosen to speed up the progress of the adjustment. After entering a stable playback state, a large value of M may be chosen to reduce the frequency of adjustment and reduce software and hardware overhead.

Theoretically, at the time point for dynamic synchronization adjustment, if the audio code stream transmission speed on the terminal device side is exactly the same as the code stream playback speed on the earphone side, then the audio transmission time of the terminal device and the audio playback time of the TWS Bluetooth earphone should be completely aligned. However, due to the influence of factors such as clock deviation between the terminal device side and the earphone side, in fact, there is a deviation between the audio transmission time of the terminal device and the audio playback time of the TWS Bluetooth earphone. The following is to calculate the difference between the audio transmission time of the terminal device and the audio playback time of the TWS Bluetooth earphone at the time point when an integer number of frames are played on the earphone side, which can be divided into the following two situations:

First situation: the clock on the earphone side is slow, counting from the data synchronization time, assuming that the number of frames of audio played by the TWS Bluetooth earphone until the first preset time t(i) is N1, the number of hardware synchronization signals generated by the TWS Bluetooth earphone is N2, the time from the generation time of the latest hardware synchronization signal to the first preset time t(i) is T3, then the calculation formula of ΔT(i) is as follows:

$$\Delta T(i) = (N2 * T2 + T3) - N1 * T1$$

Second situation: the clock on the earphone side is fast, counting from the data synchronization time, assuming that the number of frames of audio played by the TWS Bluetooth earphone until the first preset time t(i) is N1, the number of hardware synchronization signals generated by the TWS Bluetooth earphone is N2, and the time from the generation time of the latest hardware synchronization signal to the first preset time t(i) is T3, where the TWS Bluetooth earphone can start a local counter to determine T3, then the calculation formula of ΔT(i) is as follows:

$$\Delta T(i) = N1 * T1 - (N2 * T2 + T3)$$

After ΔT(i) is calculated, the clock of the slave device can be adjusted by the ΔT(i). In addition, the TWS Bluetooth earphone can also adjust ΔT(i) according to an adjustable clock deviation. Assuming that a value of ΔT(i) may range from −600 μs to +600 μs, and the clock deviation that the TWS Bluetooth earphone can adjust is from −127 ppm to +127ppm. Therefore, ΔT(i) can be converted into an integer value between −127 and +127 according to a proportional relationship, that is, the adjusted ΔT(i) can be expressed as err(i), and the clock in the TWS Bluetooth earphone can be adjusted according to the adjusted ΔT(i) to speed up or slow down the audio frame playback speed of the TWS Bluetooth earphone.

It should be noted that the TWS Bluetooth earphone needs to use the formula regularly to calculate multiple ΔT(i), so that these ΔT(i) converge to zero as soon as possible, and thus every time ΔT(i) is calculated, the data synchronization time is used as the start time.

Step S802 is described as follows. The TWS Bluetooth earphone can use a proportion integration differentiation (Proportion Integration Differentiation, PID) algorithm to calculate U(i) for an i-th time. When implemented in a computer, a PID formula needs to be discretized as the formula shown below to obtain U(i):

$$U(i) = K_p err(i) + K_j \sum_{j=0}^{i} err(j) + K_d(err(i) - err(i-1))$$

where, $K_p$, $K_j$, and $K_d$ are respectively a proportional adjustment factor, an integral adjustment factor, and a differential adjustment factor of the difference between the audio transmission time of the terminal device and the audio playback time of the TWS Bluetooth earphone, and specific values are related to a maximum pulse position modulation (Pulse Position Modulation, PPM) deviation of a local crystal oscillator of the TWS Bluetooth earphone, the difference between the audio transmission time of the terminal device and the audio playback time of the TWS Bluetooth earphone, and a specified convergence speed of the difference ΔT. err(i) is an integerized result of ΔT(i), and err(i−1) is an integerized result of ΔT(i−1). The slave device adjusts the clock according to U(i). In addition, the proportional adjustment factor, the integral adjustment factor and the differential adjustment factor are also continuously updated as ΔT(i) calculated each time changes, so that ΔT(i) gradually converges to 0, so as to achieve faster and more stable synchronization.

After the TWS Bluetooth earphone performs the i-th time of audio synchronization with another TWS Bluetooth earphone, it waits for the next data synchronization time to perform the next round of audio synchronization.

It should be noted that the TWS Bluetooth earphone need to invoke a formula regularly to calculate multiple ΔT, so that these ΔT converge to zero as quickly as possible. Each time ΔT is calculated, the data synchronization time is used as the start time.

The TWS Bluetooth earphone is taken as an example in the following. It is assumed that a difference range of the difference ΔT described above is −600 μs~+600 μs, the clock deviation that the TWS Bluetooth earphone can adjust is from −127 ppm to +127 ppm. The PID calculation is performed every 100 ms, and U(i) is calculated based on a current ΔT. In the PID algorithm, the proportional coefficient $K_p=20$, the integral coefficient $K_j=0.1$, and the differential coefficient $K_d=0.1$. Each ΔT gradually converges to zero. After the $20^{th}$ adjustment, that is after 100 ms*20=2 seconds, ΔT is very close to zero, which can meet a requirement of the TWS Bluetooth earphone for synchronous playback.

In this embodiment, the TWS Bluetooth earphone can use the hardware synchronization signal to determine the difference between the audio transmission time of the terminal device and the audio playback time of the TWS Bluetooth earphone, and adjust the clock in the TWS Bluetooth earphone according to the difference, so that the TWS Bluetooth earphone performs data synchronization with another TWS Bluetooth earphone. On the one hand, the hardware synchronization signal has higher generation efficiency than a software synchronization signal implemented by software program code, so that the efficiency of data synchronization between slave devices can be improved. On the other hand, the BLE protocol stack generally includes from bottom to top: physical layer, link layer, host controller interface, generic access profile, logical link control and adaptation protocol, security manager protocol, and generic attribute profile. The master device sequentially constructs data packets from the top layer down, and transmits them to the slave device through the physical layer. The slave device unpacks the data packets at each layer, and the above hardware synchronization signal can be generated at the physical layer or the link layer, but not at a higher protocol layer. In this way, the generation efficiency of the hardware synchronization signal can also be improved, and then the data synchronization efficiency can be improved.

Figure 10:
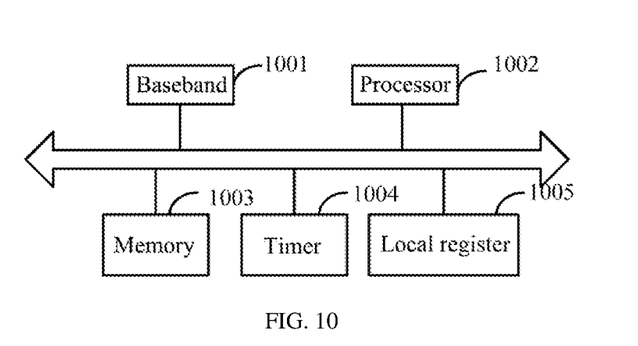
FIG. 10 is a schematic diagram of a slave device provided by an embodiment of the present application.

FIG. 10 is a schematic diagram of a slave device provided by an embodiment of the application. As shown in FIG. 10, the slave device includes a baseband 1001, a processor 1002, and a memory 1003. The memory 1003 is configured to store computer-executable instructions to enable the processor 1002 to implement functions of the processor 1002 through the instructions. The baseband 1001 is configured to generate a hardware synchronization signal if a first data packet received by the baseband 1001 from a master device during a current Bluetooth low energy (BLE) connection interval is a new data packet, where the hardware synchronization signal is a synchronization signal generated by a pure hardware circuit. The processor 1002 is configured to, if a data synchronization time of the slave device with the master device is a preset time in the current BLE connection interval, perform data synchronization with the master device at the data synchronization time through triggering by the hardware synchronization signal.

Optionally, the slave device further includes a timer 1004. Correspondingly, the processor 1002 is further configured to start the timer 1004 in a first BLE connection interval, and set the data synchronization time to the timer 1004, so that the timer 1004 reaches the data synchronization time and generates an interrupt signal. The first BLE connection interval is any BLE connection interval before the current BLE connection interval. The processor 1002 is also configured to, if the baseband 1001 does not generate the hardware synchronization signal in the current BLE connection interval, and the data synchronization time is the preset time in the current BLE connection interval, perform data synchronization with the master device at the data synchronization time through triggering by the interrupt signal.

Optionally, the baseband 1001 is also configured to generate the hardware synchronization signal if a first data packet received by the baseband 1001 from the master device in a second BLE connection interval is a new data packet, where the second BLE connection interval is any BLE connection interval from the first BLE connection interval to a previous BLE connection interval of the current BLE connection interval. The processor 1002 is further configured to initialize the timer 1004 once, every time the baseband 1001 generates the hardware synchronization signal.

Optionally, the first data packet includes: a next expected sequence number NESN and a sequence number SN of the first data packet. Correspondingly, the baseband 1001 is also configured to determine whether the first data packet is a new data packet according to the NESN and the SN.

Optionally, the slave device further includes: a local register 1005. Each BLE connection interval has a corresponding number. The processor 1002 is further configured to store a corresponding serial number of a BLE connection interval in the local register 1005 if the baseband 1001 generates the hardware synchronization signal in the BLE connection interval. Correspondingly, the baseband 1001 is also configured to determine the current BLE connection interval according to the corresponding serial number of each BLE connection interval.

Optionally, the processor 1002 is specifically configured to start playing an audio code stream in synchronization with the master device at the data synchronization time.

Optionally, the processor 1002 is further configured to: obtain a proportional adjustment factor, an integral adjustment factor, a differential adjustment factor of a difference between an audio transmission time of a master device and an audio playback time of the slave device, and a differenceΔT(i) between the audio transmission time of the master device and the audio playback time of the slave device calculated for an i-th time from the data synchronization time, where 1≤i≤k, i is an integer, k is a number of times that the slave device calculates the difference between the audio transmission time of the master device and the audio playback time of the slave device from the data synchronization time to a current time; and, adjust a clock in the slave device according to the proportional adjustment factor, the integral adjustment factor, the differential adjustment factor, and ΔT(i), so that the slave device performs audio synchronization with other slave device.

Optionally, the processor 1002 is specifically configured to: from the data synchronization time, count a number N1 of frames of audio played by the slave device, a number N2 of hardware synchronization signals generated by the slave device, and a time T3 from a generation time of a latest hardware synchronization signal to a first preset time t(i), until the first preset time t(i); obtain a time length T2 of a BLE connection interval and a time length T1 of each frame of audio played by the slave device; and determine the difference ΔT(k) between the audio transmission time of the master device and the audio playback time of the slave device until the first preset time t(i) according to N1, N2, T3, T2, and T1.

Optionally, the processor 1002 specifically determines ΔT(i) according to a following formula, including:

$\Delta T(i)=(N2*T2+T3)-N1*T1$

Optionally, a difference between the first preset time t(i) and the data synchronization time is a common multiple of T1 and T2.

Optionally, the processor 1002 is further configured to: adjust ΔT(i) to be within a clock range of the slave device. Correspondingly, the processor 1002 is specifically configured to adjust a phase-locked loop and/or a clock in the slave device according to the proportional adjustment factor, the integral adjustment factor, the differential adjustment factor, and the adjusted ΔT(i).

Optionally, the preset time in the current BLE connection interval is any one of the following: a start time of the current BLE connection interval, a generation time of the hardware synchronization signal, and a second preset time after the generation time of the hardware synchronization signal.

Optionally, the baseband 1001 is also configured to determine the data synchronization time.

The slave device provided in this embodiment can be configured to execute the above-mentioned data synchronization method. For the contents and effects, please refer to the method embodiment part, which will not be repeated here.

The present application also provides a data synchronization system, which includes a master device and a slave device, and the slave device can execute the above data synchronization method. The master device may be a terminal device, and the slave device may be a TWS Bluetooth earphone. For the contents and effects of this embodiment, please refer to the method embodiment part, which will not be repeated here.

The present application also provides a chip, which can execute the above-mentioned data synchronization method. For the contents and effects of this embodiment, please refer to the method embodiment part, which will not be repeated here.

The present application also provides a storage medium, including: computer-executable instructions, and the computer-executable instructions are configured to implement the aforementioned data synchronization method.

An embodiment of the present application also provides a program product, which includes computer executable instructions (i.e., a computer program) to implement the aforementioned data synchronization method.

What is claimed is:

1. A data synchronization method, comprising:
generating, by a slave device, a hardware synchronization signal, in response to a first data packet being received by the slave device from a master device during a current Bluetooth low energy (BLE) connection interval is a new data packet, wherein the hardware synchronization signal is a synchronization signal generated by a pure hardware circuit; and
performing, by the slave device, data synchronization with the master device at a data synchronization time through triggering by the hardware synchronization signal, in response to the data synchronization time of the slave device with the master device being a preset time in the current BLE connection interval;
the method further comprising: starting, by the slave device, a timer in a first BLE connection interval and setting the data synchronization time to the timer, so that the timer generates an interrupt signal at the data synchronization time, wherein the first BLE connection interval is any BLE connection interval before the current BLE connection interval; and
performing, by the slave device, data synchronization with the master device at the data synchronization time through triggering by the interrupt signal, in response to the slave device not generating the hardware synchronization signal in the current BLE connection interval, and the data synchronization time being the preset time in the current BLE connection interval;
generating, by the slave device, the hardware synchronization signal in response to the first data packet being received by the slave device from the master device in a second BLE connection interval being a new data packet, wherein the second BLE connection interval is any BLE connection interval from the first BLE connection interval to a previous BLE connection interval of the current BLE connection interval; and
initializing, by the slave device, the timer once, every time the slave device generates the hardware synchronization signal.

2. The method according to claim 1, wherein
the first data packet comprises: a next expected sequence number NESN and a sequence number SN of the first data packet; and
correspondingly, the slave device judges whether the first data packet is a new data packet according to the NESN and the SN.

3. The method according to claim 1, wherein
each BLE connection interval has a corresponding serial number, and in response to the slave device generating a hardware synchronization signal in a BLE connection interval, then the slave device stores the corresponding serial number of the BLE connection interval;
correspondingly, before performing, by the slave device, data synchronization with the master device at the data synchronization time through triggering by the hardware synchronization signal, in response to the data synchronization time of the slave device with the master device being the preset time in the current BLE connection interval, the method further comprises:
determining, by the slave device, the current BLE connection interval according to the corresponding serial number of each BLE connection interval; and
storing, by the slave device, the corresponding serial number of the BLE connection interval comprises:
storing, by the slave device, the corresponding serial number of the BLE connection interval in a local register.

4. The method according to claim 1, wherein
the performing of data synchronization with the master device at the data synchronization time comprises:
starting, by the slave device, playing an audio code stream in synchronization with the master device at the data synchronization time;
the method further comprising:
obtaining, by the slave device, a proportional adjustment factor, an integral adjustment factor and a differential adjustment factor of a difference between an audio transmission time of the master device and an audio playback time of the slave device, and a difference ΔT(i) between the audio transmission time of the master device and the audio playback time of the slave device calculated for an i-th time from the data synchronization time, wherein 1≤i≤k, i is an integer, and k is a number of times the slave device calculates the difference between the audio transmission time of the master device and the audio playback time of the slave device from the data synchronization time to a current time;

adjusting, by the slave device, a clock in the slave device according to the proportional adjustment factor, the integral adjustment factor, the differential adjustment factor, and the $\Delta T(i)$, so that the slave device performs audio synchronization with the other slave device.

5. The method according to claim 4, wherein the obtaining, by the slave device, a difference $\Delta T(i)$ between the audio transmission time of the master device and the audio playback time of the slave device calculated for the i-th time from the data synchronization time, comprising:

counting, by the slave device, from the data synchronization time, a number N1 of frames of audio played by the slave device, a number N2 of hardware synchronization signals generated by the slave device, and a time T3 from a generation time of a latest hardware synchronization signal to a first preset time t(i), until the first preset time t(i);

obtaining, by the slave device, a time length T2 of a BLE connection interval, and a time length T1 of each frame of audio played by the slave device; and determining, by the slave device, the difference $\Delta T(i)$ between the audio transmission time of the master device and the audio playback time of the slave device until the first preset time t(i) according to the N1, the N2, the T3, the T2, and the T1.

6. A data synchronization system, comprising:

a master device and a slave device, wherein the slave device is configured to execute the data synchronization method according to claim 1.

7. A chip, wherein the chip is configured to execute a data synchronization method according to claim 1.

8. A non-transitory computer storage medium, comprising computer-executable instructions which are configured to implement the data synchronization method according to claim 1.

9. A slave device, comprising:

a baseband and a processor; wherein the baseband is configured to generate a hardware synchronization signal in response to a first data packet being received by the baseband from a master device during a current Bluetooth low energy (BLE) connection interval is a new data packet, wherein the hardware synchronization signal is a synchronization signal generated by a pure hardware circuit; and the processor is configured to perform data synchronization with the master device at a data synchronization time through triggering by the hardware synchronization signal, in response to the data synchronization time of the slave device with the master device being a preset time in the current BLE connection interval;

the device furether comprising:

a timer;

the processor is further configured to start the timer in a first BLE connection interval, and set the data synchronization time to the timer, so that the timer generates an interrupt signal at the data synchronization time, wherein the first BLE connection interval is any BLE connection interval before the current BLE connection interval; and the processor is further configured to perform data synchronization with the master device at the data synchronization time through triggering by the interrupt signal, in response to the baseband not generating the hardware synchronization signal in the current BLE connection interval, and the data synchronization time being the preset time in the current BLE connection interval, wherein:

the baseband is further configured to generate the hardware synchronization signal in response to a first data packet being received by the baseband from the master device in a second BLE connection interval being a new data packet, wherein the second BLE connection interval is any BLE connection interval from the first BLE connection interval to a previous BLE connection interval of the current BLE connection interval; and the processor is further configured to initialize the timer once, every time the baseband generates the hardware synchronization signal.

10. The device according to claim 9, wherein the device further comprises: a local register;

each BLE connection interval has a corresponding serial number, and the processor is further configured to store the corresponding serial number of a BLE connection interval in the local register, in response to the baseband generating the hardware synchronization signal in the BLE connection interval; and correspondingly, the baseband is further configured to determine the current BLE connection interval according to the corresponding serial number of each BLE connection interval.

11. The device according to claim 9, wherein:

the processor is specifically configured to start playing an audio code stream in synchronization with the master device at the data synchronization time.

12. The device according to claim 11, wherein the processor is further configured to:

obtain, by the slave device, a proportional adjustment factor, an integral adjustment factor and a differential adjustment factor of a difference between an audio transmission time of the master device and an audio playback time of the slave device, and a difference $\Delta T(i)$ between the audio transmission time of the master device and the audio playback time of the slave device calculated for an i-th time from the data synchronization time, wherein $1 \leq i \leq k$, i is an integer, and k is a number of times the slave device calculates the difference between the audio transmission time of the master device and the audio playback time of the slave device from the data synchronization time to a current time; and adjust, by the slave device, a clock in the slave device according to the proportional adjustment factor, the integral adjustment factor, the differential adjustment factor, and the $\Delta T(i)$, so that the slave device performs audio synchronization with other slave device.

13. The device according to claim 12, wherein the processor is specifically configured to:

count, from the data synchronization time, a number N1 of frames of audio played by the slave device, a number N2 of hardware synchronization signals generated by the slave device, and a time T3 from a generation time of a latest hardware synchronization signal to a first preset time t(i), until the first preset time t(i);

obtain a time length T2 of a BLE connection interval, and a time length T1 of each frame of audio played by the slave device; and determine the difference $\Delta T(i)$ between the audio transmission time of the master device and the audio playback time of the slave device until the first preset time t(i), according to the N1, the N2, the T3, the T2, and the T1.

14. The device according to claim 12, wherein the processor is further configured to:
adjust the ΔT(i) to be within a clock range of the slave device; and
correspondingly, the processor is specifically configured to adjust the clock in the slave device according to the proportional adjustment factor, the integral adjustment factor, the differential adjustment factor and the adjusted ΔT(i).

15. The device according to claim 9, wherein the baseband is further configured to determine the data synchronization time.

* * * * *